US 8,963,859 B2

(12) United States Patent
Wang

(10) Patent No.: US 8,963,859 B2
(45) Date of Patent: Feb. 24, 2015

(54) EDGE GRIP DETECTION METHOD OF A TOUCH PANEL AND A DEVICE USING THE SAME

(75) Inventor: Wan-Qiu Wang, Singapore (SG)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 37 days.

(21) Appl. No.: 13/436,989

(22) Filed: Apr. 1, 2012

(65) Prior Publication Data

US 2013/0069886 A1    Mar. 21, 2013

(30) Foreign Application Priority Data

Sep. 16, 2011  (CN) .......................... 2011 1 0281462

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01)
USPC ..................... 345/173; 178/18.01; 178/18.02; 345/178

(58) Field of Classification Search
USPC ..................... 345/173–183; 178/18.01–18.11, 178/19.01–19.07, 20.01–20.04
See application file for complete search history.

(56) References Cited

U.S. PATENT DOCUMENTS

| 5,784,054 | A  | * | 7/1998 | Armstrong et al. | 345/177 |
| 8,614,693 | B2 | * | 12/2013 | King et al. | 345/174 |
| 2001/0043189 | A1 | * | 11/2001 | Brisebois et al. | 345/156 |
| 2005/0012723 | A1 | * | 1/2005 | Pallakoff | 345/173 |
| 2008/0012835 | A1 |  | 1/2008 | Rimon et al. | |
| 2008/0012838 | A1 | * | 1/2008 | Rimon | 345/174 |
| 2009/0174679 | A1 | * | 7/2009 | Westerman | 345/173 |
| 2009/0179865 | A1 | * | 7/2009 | Kumar | 345/173 |
| 2009/0259969 | A1 | * | 10/2009 | Pallakoff | 715/808 |
| 2011/0025629 | A1 | * | 2/2011 | Grivna et al. | 345/173 |
| 2011/0057899 | A1 | * | 3/2011 | Sleeman et al. | 345/174 |
| 2012/0050210 | A1 | * | 3/2012 | King et al. | 345/174 |
| 2012/0075212 | A1 | * | 3/2012 | Park et al. | 345/173 |
| 2012/0306823 | A1 | * | 12/2012 | Pance et al. | 345/177 |
| 2012/0313865 | A1 | * | 12/2012 | Pearce | 345/173 |
| 2013/0002599 | A1 | * | 1/2013 | Townsley et al. | 345/174 |
| 2013/0009915 | A1 | * | 1/2013 | Hering | 345/178 |
| 2013/0033434 | A1 | * | 2/2013 | Richardson et al. | 345/173 |

* cited by examiner

Primary Examiner — Gene W Lee
(74) Attorney, Agent, or Firm — Gokalp Bayramoglu

(57) ABSTRACT

The present disclosure relates to a touch panel technology, and especially to an edge grip detection method of a touch panel and a device using the same. The edge grip detection method comprises: determining whether an edge area state has changed; eliminating a first edge signal when the edge area state does not change; and updating the first edge signal as next standard signal when the edge area state changes. The edge grip detection method and an edge grip detecting device of the touch panel opportunely detect and dynamically update state and data of the edge area, thereby eliminating edge grip signals from touch signals of the touch panel to obtain normal touch signals. Thus, impact on the normal operation of the touch panel by edge grips is reduced.

16 Claims, 7 Drawing Sheets

EDGE GRIP DETECTION METHOD OF A TOUCH PANEL AND A DEVICE USING THE SAME

BACKGROUND OF THE INVENTION

This Application claims the benefit of the People's Republic of China Application No. 201110281462.1, filed on Sep. 16, 2011.

FIELD OF THE INVENTION

The present disclosure relates to a touch panel technology, and more particularly relates to an edge grip detection method of a touch panel and a device using the same.

DESCRIPTION OF THE RELATED ART

At present, the technology of directly performing operations on electronic devices by touch, with fingers and other compatible touch objects, has been widely applied in daily work and life. These electronic devices usually adopt a touch panel to detect touch actions and generate relative electric signals for subsequent operations. According to different touch sensing principles, touch panels include resistive type, capacitive type, optical type, electromagnetic type, and acoustic-wave type of panels. Working principle of a capacitive touch panel includes a user touching surface of a touch panel with fingers, stylus pen and the like conductive objects leading to change in capacitance at the touch point on the touch panel surface. A processor detects such capacitive changes to calculate coordinates of touch points, thereby achieving the objective of touch operations.

FIG. 1 is a structural diagram of a capacitive touch panel of prior art. As shown in FIG. 1, a touch panel 10 comprises a first electrode 11 that is disposed along a first direction, and a second electrode 12 that is disposed along a second direction, wherein the first electrode 11 and the second electrode 12 are electrically insulated from each other and intercross each other to form a gridding electrode pattern. Further, the first electrode 11 and the second electrode 12 are connected to a processor by wires (not shown). When a touch object 20 touches or contacts with the touch panel 10, capacitance (mutual capacitance) between the first electrode 11 and the second electrode 12 of touch panel changes, or capacitance (self-capacitance) between the first electrode 11 or the second electrode 12 and earth changes. The processor respectively scans the first electrode 11 and the second electrode 12 and compares the change in capacitance "before touch" with that "after touch" to confirm transverse coordinates and lengthways coordinates, thereby ensuring position coordinates of the touch object 20. As shown in FIG. 1, the position coordinates of the touch object 20 (X2, Y3) can be determined based on sensing values of X axis and Y axis.

When aforesaid touch panel 10 is integrated on a touch device, such as an IPad, an edge grip 22 often occurs on edge area of the touch panel 10 as palms of the hand of a user hold the edge area of the touch panel 10. Capacitance change produced by the edge grip 22 can impact the normal operations of touch panel. As shown in FIG. 2, the processor is able to determine normal coordinates of the touch point 20 based on changes in capacitance of X, Y axis, and can also detect wrong touch points (Xn, Yn−1) and (Xn, Yn+1) that are caused by the edge grip 22, thereby leading to incorrect operation of the touch panel 10.

Therefore, in order to avoid an edge grip impacting normal operations of a touch panel, accurately determining position coordinates of normal touch points when the edge grip exists, becomes an issue to be resolved.

SUMMARY OF THE INVENTION

An objective of the present disclosure is to provide an edge grip detection method of a touch panel and a detection device using the same, which can opportunely detect and dynamically update state and data of an edge area, and further eliminate edge signals from the touch signals of the touch panel, thereby obtaining normal touch signals and reducing impact on normal operations of the touch panel caused by the edge grip.

An edge grip detection method of a touch panel, wherein the touch panel comprises an edge area and an operation area, the method comprises the steps of: determining whether an edge area state has changed; eliminating a first edge signal when the edge area state does not change; and updating the first edge signal as a next standard signal when the edge area state changes.

Another objective of the present disclosure is to provide an edge grip detection device of a touch panel.

An edge grip detection device of a touch panel, wherein the touch panel comprises an edge area and an operation area, comprises: a first determining unit which is used for determining whether an edge area state has changed; an eliminating unit which is used for eliminating a first edge signal if the edge area state does not change.

By adopting the edge grip detection method, the detection device of the touch panel is enabled to opportunely detect and dynamically update state and data of an edge area. In the proposed method, when an edge grip occurs in the edge area of the touch panel, edge signals are eliminated from touch signals of the touch panel so as to obtain a normal touch signal, leading to accurate determination of the position of the normal touch point by avoiding impacts on the normal operation of the touch panel caused by the edge grip, thereby improving the operation accuracy of the touch panel.

BRIEF DESCRIPTION OF THE DRAWINGS

For those skilled in the art, embodiments and drawings described below are for illustration purpose only and do not limit the scope of the present disclosure in any manner.

DETAILED DESCRIPTION OF THE EMBODIMENTS

The specific embodiments accompanied with drawings described below are to be considered exemplary and not limiting.

Figure 1:
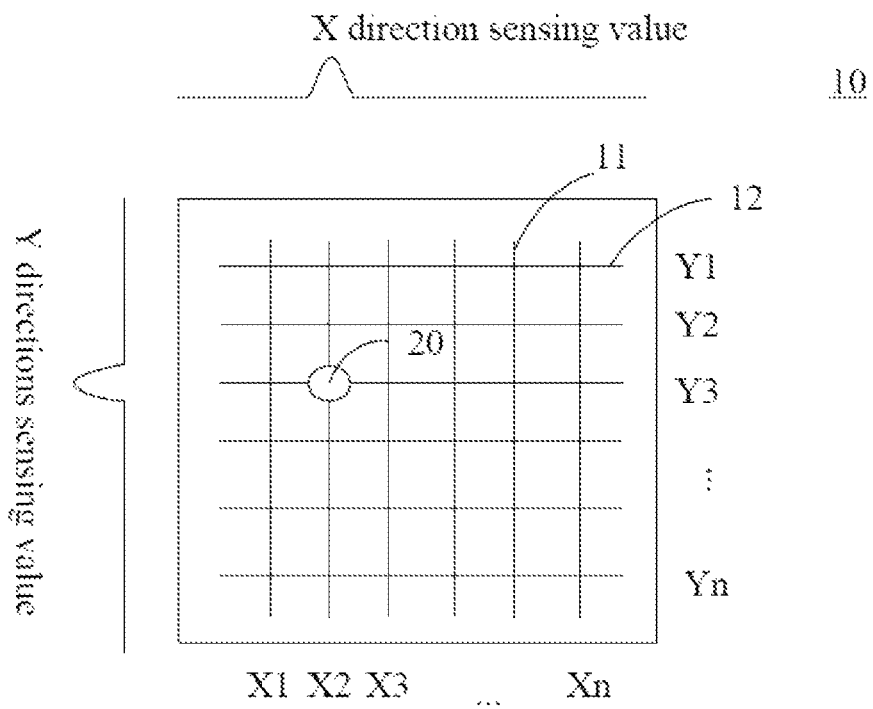
FIG. 1 is a structural diagram of a capacitive touch panel of prior art.
Figure 2:
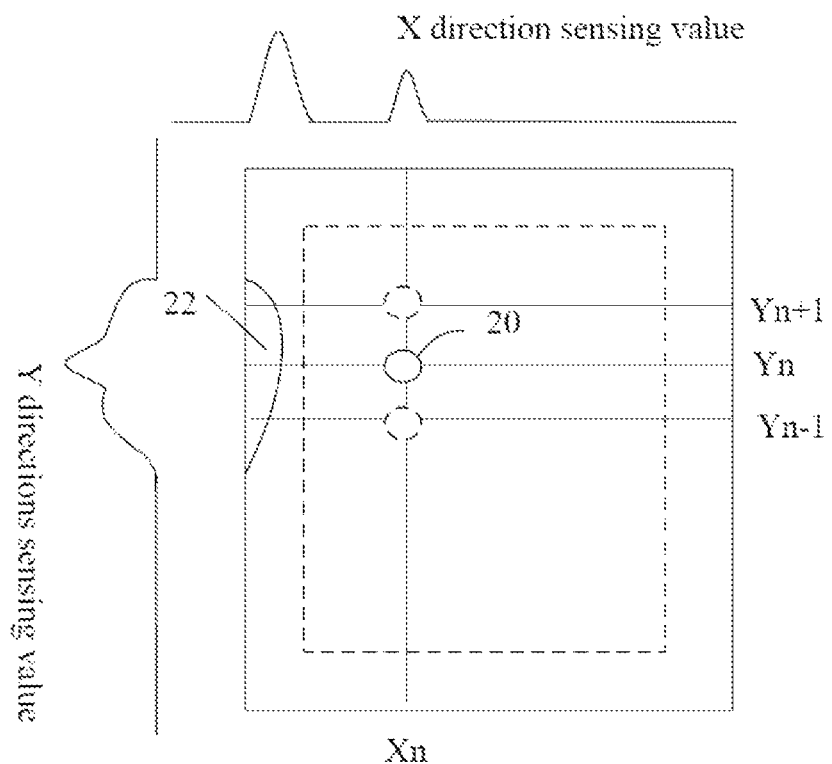
FIG. 2 is a diagram of the touch panel as shown in FIG. 1 with an edge grip.
Figure 3:
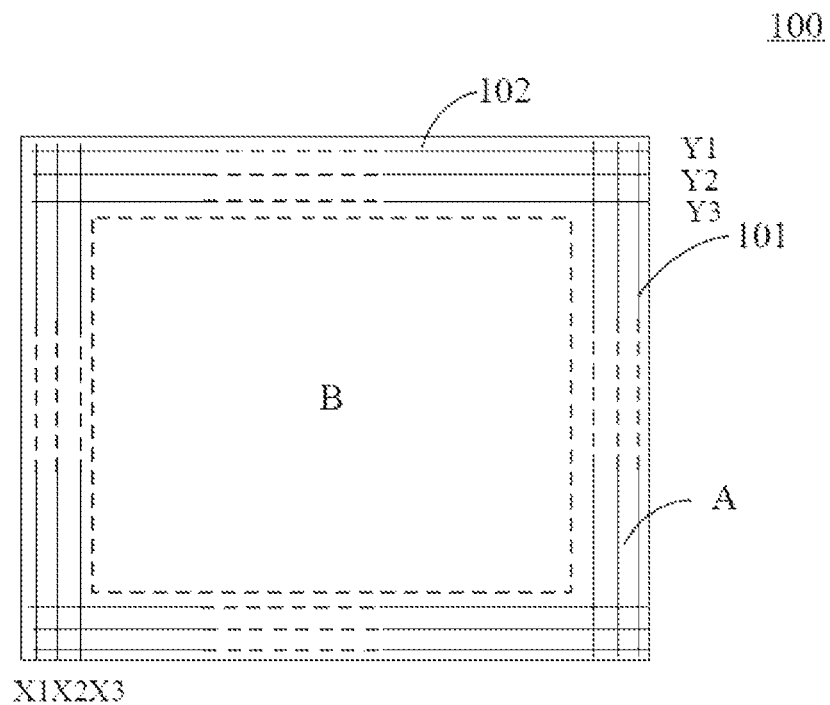
FIG. 3 is a structural diagram of a touch panel in accordance with an embodiment provided by the present disclosure.

As shown in FIG. 3, a touch panel 100 comprises a plurality of first axial electrodes 101 and a plurality of second axial electrodes 102. The first axial electrodes 101 and the second axial electrodes 102 are intersect and are insulated from each other. Operation area of the touch panel 100 is used for sensing and is disposed with sensing electrodes that can be divided into an edge area A and an operation area B. The edge area A comprises one or more of left edge area, right edge area, top edge area and down edge area. For illustrations, the left edge area is the area corresponding to the electrodes X1, X2 and X3 disposed from left to right, and the right edge area is the area corresponding to the electrodes Xn−2, Xn−1 and Xn disposed from left to right. Similarly, the top edge area is the area corresponding to the electrodes Y1, Y2 and Y3 disposed from up to down, and the down edge area is the area corresponding to the electrodes Yn−2, Yn−1 and Yn disposed from up to down. Sizes of the edge areas are not limited to this and can be adjusted based on actual size of the touch panel 100.

Figure 4:
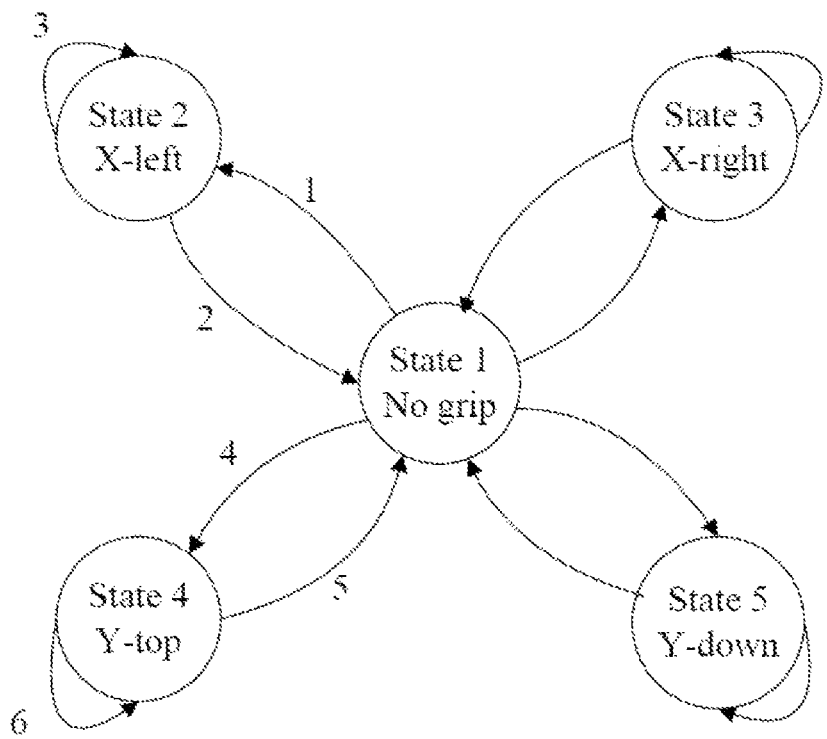
FIG. 4 is a diagram of an edge area state of the touch panel in accordance with the embodiment provided by the present disclosure.

The edge area A of the touch panel 100 would appear in different states based on status of use. Specifically, in the present embodiment, five states can be defined, as shown in FIG. 4. State 1: edge area does not have edge grips (No grip); State 2: left edge area has edge grips (X-left); State 3: right edge area has edge grips (X-right); State 4: top edge area has edge grips (Y-top); State 5: down edge area has edge grips (Y-down).

Figure 5:
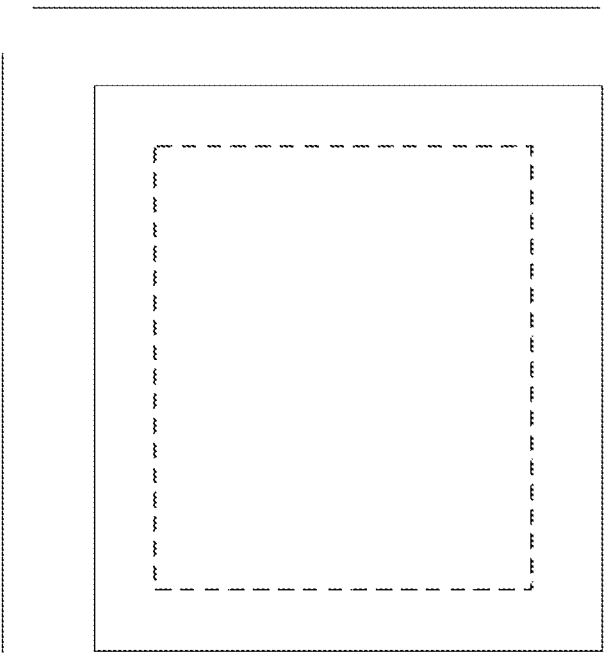
FIG. 5 to FIG. 8 are transferring diagrams of an edge area state of the touch panel in accordance with embodiments provided by the present disclosure.
Figure 6:
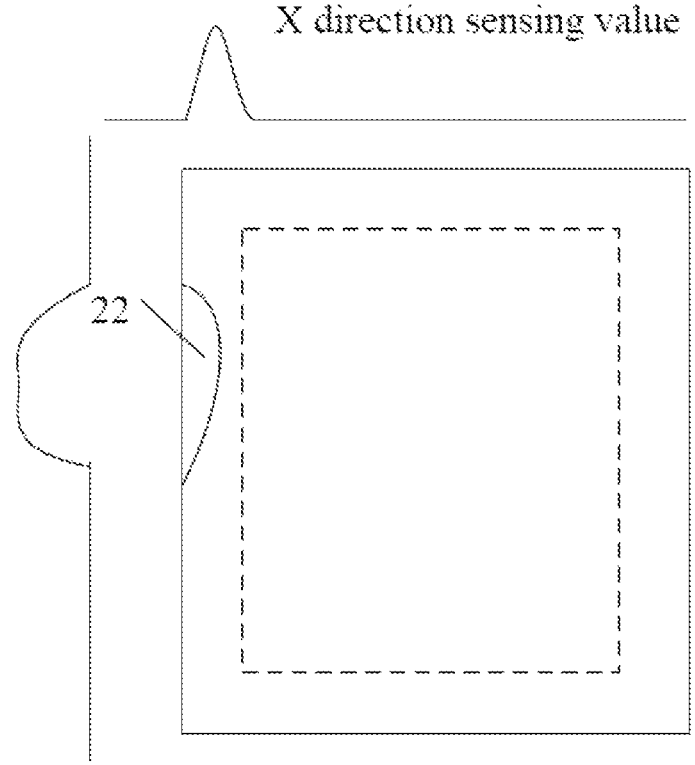
Figure 7:
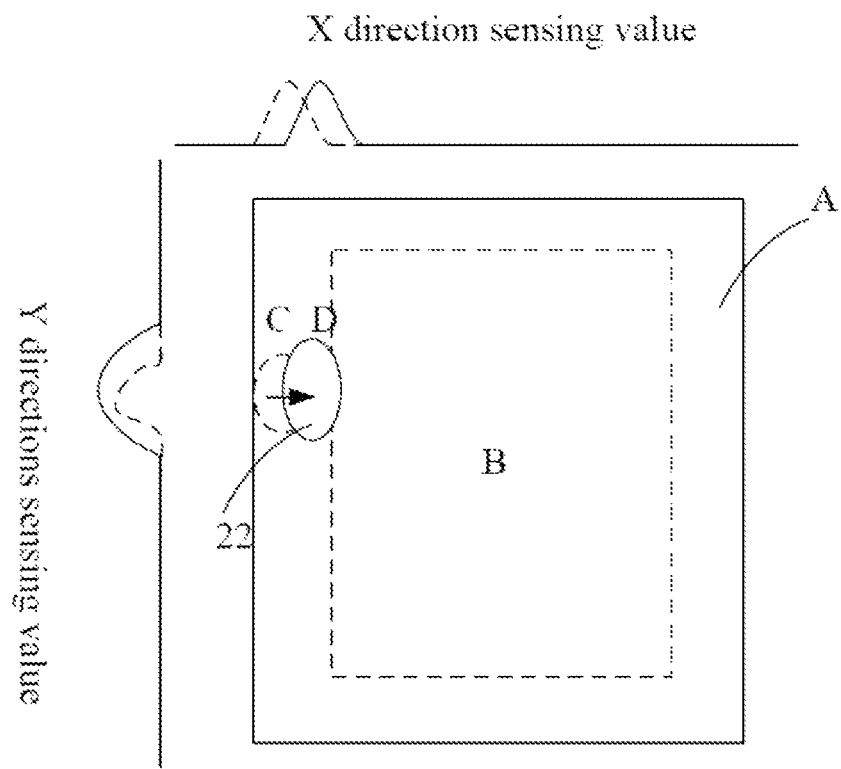
Figure 8:
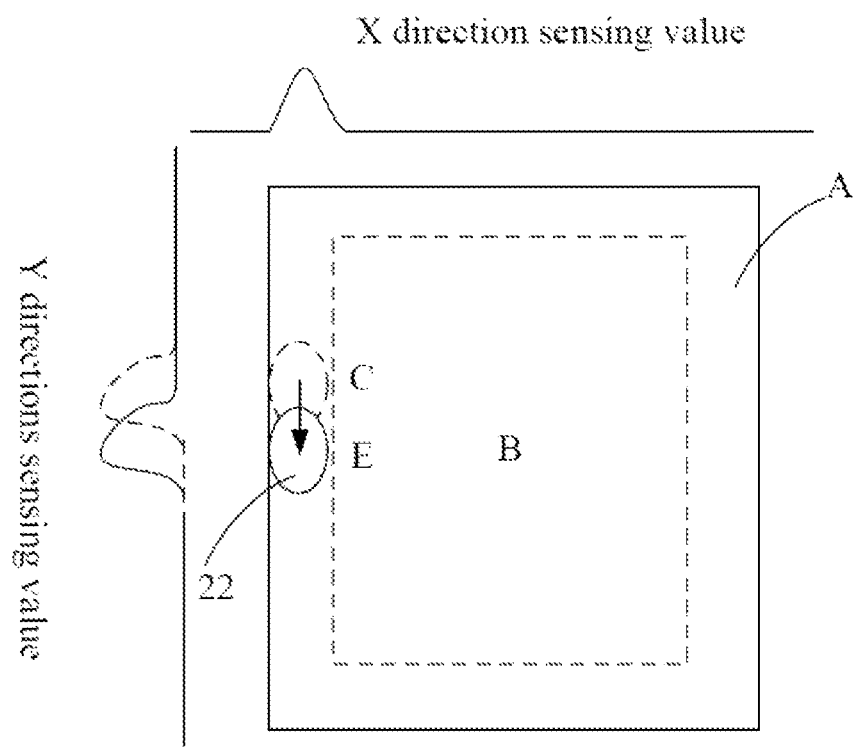

State transferring may occur between 'having an edge grip' state and 'no edge grip' state. FIG. 5 represents state of left edge area in an initial state, namely, state of no edge grip. FIG. 5 to FIG. 6 shows transferring process from state 1 (No grip) to state 2 (X-left), namely, the edge grip 22 appears on the left edge area. On the contrary, FIG. 6 to FIG. 5 is the transferring process from state 2 (X-left) to state 1 (No grip), when the edge grip 22 leaves the touch panel. FIG. 7 shows the transferring process from State 2 (X-left) to State 2' (X-left), wherein the edge grip 22 moves left and right on the left edge area. FIG. 8 shows the edge grip 22 moves up and down on the left edge area.

Aforesaid states and state transferring can be recorded and monitored by a state machine. Parameters that are required to be monitored mainly comprises touch position information and signal strength of corresponding touch position. The parameters can be specifically shown as capacitance sensing values.

Left edge area (X1, X2, and X3) and the top edge area (Y1, Y2, and Y3) are illustratively describing conditions of state transferring. The state transferring of right edge area is similar to that of left edge area while the state transferring of lower edge area is similar to that of upper edge area. Therefore, they are not described here again.

When the system is initialized, the state machine is located in state 1. When state 1 is transferred to state 2, condition 1 is: sum of capacitance sensing values (CX1+CX2+CX3) of first axial electrode on the left edge area is greater than a second threshold value (Th2), and sum of capacitance sensing values (CX4+CX5+ . . . +CXn) of all other first axial electrodes is less than a third threshold value (Th3), and number of touched first axial electrodes is less than or equal to number of electrodes on the left edge area, namely, the number of touched electrodes are less than or equal to 3. When condition 1 has been satisfied, the state machine records current edge area state as state 2. If the last edge area state is state 1, then the state 1 transfers to state 2.

When the state 2 is transferred to the state 1, condition 2 is: number of touched first axial electrodes on the left edge area is 0. When condition 2 has been satisfied, current edge area state can be determined as state 1. If the last edge area state is state 2, then the state 2 transfers to the state 1.

When the state 2 is transferred to the state 2', condition 3 is: when condition 1 has been satisfied, and variation of capacitance value ($\Delta$ CX1 or $\Delta$ CX2 or $\Delta$ CX3) of any first axial electrodes (X1 or X2 or X3) on the left edge area is greater than a fourth threshold value (Th4), it means that the left edge area state will still be having edge grips as shown in FIG. 7, wherein the edge grip 22 moves from position C to position D. Alternatively, condition 3' is: when the condition 1 has been satisfied, and variation of the sum of capacitance sensing values (CY1 or CY2 or CY3) of any second axial electrode is greater than a fifth threshold value (Tb5), as shown in FIG. 8, the edge grip 22 moves from position C to position E. Here, the state machine can record current edge area state as state 2'. If last edge area state is state 2, then state 2 transfers to state 2'.

When state 1 is transferred to state 4, condition 4 is: sum of capacitance sensing values (CY1+CY2+CY3) of the second axial electrode on the upper edge area is greater than second threshold value (Th2), and sum of capacitance sensing values (CY4+CY5+ . . . +CYn) of all other second axial electrodes is less than third threshold value (Th3), and number of touched second axial electrodes is less than or equal to number of electrodes on the upper edge area, namely the number of touched electrodes is less than or equal to 3. When the condition 4 has been satisfied, the state machine can record current edge area state as state 4. If the last edge area state is state 1, then state 1 transfers to state 4.

When state 4 is transferred to state 1, condition 5 is: number of touched second axial electrodes on the top edge area is 0. When the condition 2 has been satisfied, current edge area state can be recorded as state 1 by the state machine. If last edge area state is state 4, then state 4 transfers to state 1.

When state 4 is transferred to the state 4', condition 6 is: when condition 4 has been satisfied, and variation of capacitance value ($\Delta$ CY1 ore CY2 or $\Delta$ CY3) of any second axial electrode (Y1 or Y2 or Y3) on the upper edge area is greater than fourth threshold value (Th4), the upper edge area will be having edge grips, and the edge gripping position would moving up and down on the upper edge area. Alternatively, condition 6': when condition 4 has been satisfied, and variation of sum of capacitance sensing values (CX1 or CX2 or CX3) of any first axial electrode is greater than fifth threshold value (Th5), then edge gripping position is moving left and right on the upper edge area. Here, the state machine can record the current edge area state as state 4'. If the last edge area state is the state 4, then state 4 transfers to state 4'.

When aforesaid edge grip occurs on edge area, edge grip detection method of the touch panel provided by the present disclosure can be adopted for eliminating edge signals to obtain normal touch signals. The detection method particularly comprises: a) determining whether an edge area state has changed; b) if the edge area state does not change, eliminating a first edge signal; and c) if the edge area state changes, updating the first edge signal as a next standard signal. The first edge signal is namely an edge grip signal. Detailed steps of the detection method are described below.

Figure 9:
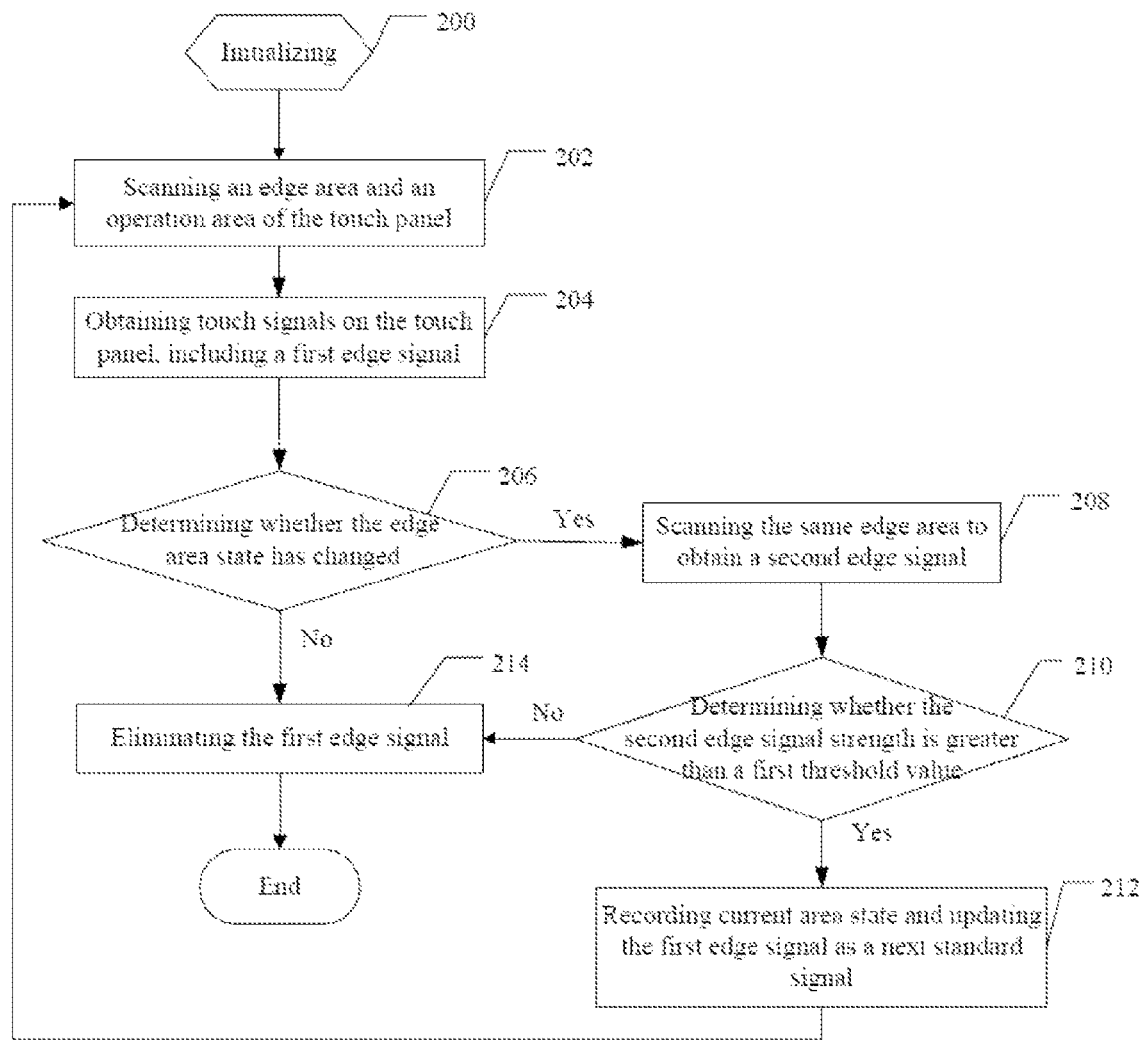
FIG. 9 is a flow chart of an edge grip detection method of a touch panel in accordance with the embodiments of the present disclosure.

FIG. 9 is a flow chart of an edge grip detection method in accordance with an embodiment of the present disclosure. The edge grip detection method comprises:

Step 200: initializing a touch panel when an operation is being started, and recording capacitance sensing values of X and Y directions as standard signals. For example, capacitance sensing values of X and Y directions as shown in FIG. 5 are recorded when initializing.

Step 202: scanning an edge area and an operation area of the touch panel. For example, scanning first axial electrodes 101 (X1, X2 . . . Xn) and second axial electrodes 102 (Y1, Y2 . . . Yn), respectively, in a proper sequence. If fingers touch the touch panel, capacitance on the electrodes corresponding to related touch positions would change.

Step 204: obtaining touch signals on the touch panel. The touch signal comprises a first edge signal, namely an edge grip signal. Specifically in the present embodiment, the touch signal can be sampled and calculated, using A/D conversion, to obtain capacitance sensing signal waveform of X and Y axis. Illustratively, when the edge grip 22 occurs on the left edge area, the signal waveform graph as shown in FIG. 6 is obtained.

Step 206: determining whether the edge area has changed, by comparing the first edge signal with last edge area state as obtained in step 204. Illustratively, to determine whether the edge area state has changed by comparing first edge signal with standard value recorded in step 200. At the same time, current edge area state is confirmed with aforesaid conditions 1 to 6.

Step 212: when it is determined that the edge area state has changed in step 206, updating the first edge signal as a next standard signal and recording current edge area state.

Figure 10:
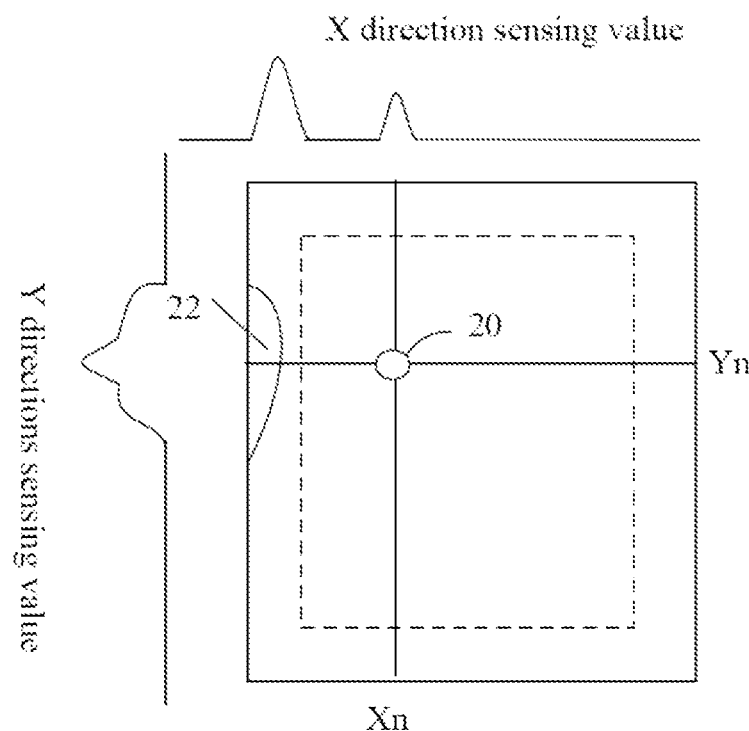
FIG. 10 is an operation diagram of a touch pad while edge grip occurs.
Figure 11:
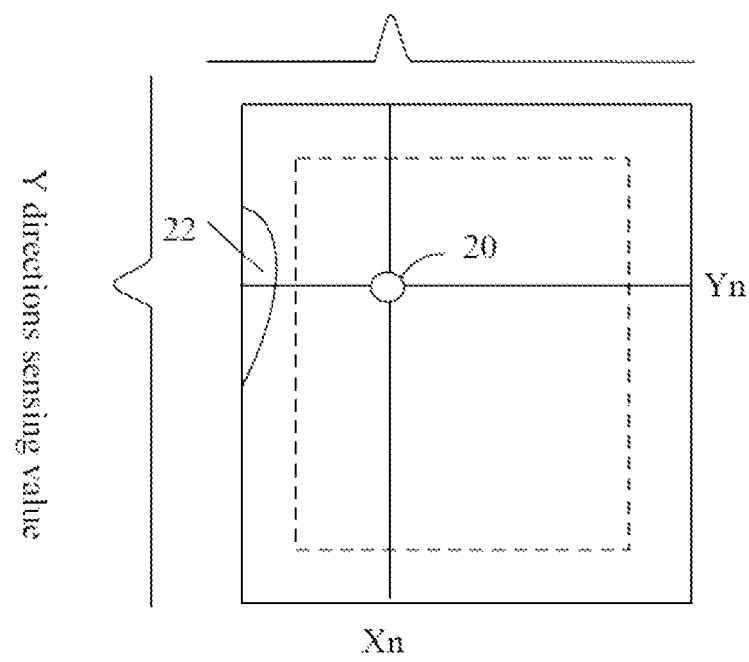
FIG. 11 is a diagram of normal touch signals obtained after edge signals are eliminated.

Steps 202, 204, 206 and 212 are continuously performed until there is no change in edge area state in step 206. After the edge area state is stable, step 214 would be carried out. The first edge signal, namely, edge touch signal is eliminated from the touch signals obtained in step 204 to obtain a normal touch signal. As shown in FIG. 10 and FIG. 11, for illustrations, when the left edge area is gripped, and the normal touch point 20 appears in the operations area, the signal waveform in FIG. 10 can be obtained through steps 202 and 204. Normal touch signals of operation area, as shown in FIG. 11, are obtained by eliminating the first edge signal, namely edge grip signal, thereby further resolving position coordinates of normal touch point 20.

In view of aforesaid edge grip detection method of a touch panel, to avoid misjudging noise signal as a first edge signal in step 206, the process may further comprise:

Step 208: re-scanning the same edge area to obtain a second edge signal. For illustrations, when it is determined that the left edge area of a touch panel has an edge grip in step 206, the step 208 scans the electrodes on the left edge area (X1, X2 and X3) again to obtain a second edge signal.

Step 210: determining whether the second edge signal strength is greater than a first threshold value (Th1). If the second edge signal strength is greater than the first threshold value (Th1), it is anticipated that at the edge area, there still exists edge grips, such that the step 212 is performed to record edge area state and update the first edge signal as the next standard signal. On the contrary, if the second edge signal strength is less than the first threshold value (Th1), it is anticipated that the first edge signal in step 206 is a noise signal. Next, step 214 is performed to eliminate the first edge signal. When the first edge signal is 0, namely no edge grip, the eliminated value in step 214 is 0. Certainly, step 208 and step 210 can be continuously performed several times, and the frequency of cyclic performance can be set according to empirical value.

In the first embodiment, the process 200->202->204->206 is performed in a proper sequence according to aforesaid process. If, in step 206, state 1 transfers to state 2, the process of 208->210->212 is continuously performed. The edge area state in state 2 and the edge signal corresponding to state 2 are both recorded in step 212. The process of 202->204->206 is performed repeatedly till the edge area state never changes again, thereby eliminating the edge signals to obtain the normal touch signals.

In the second embodiment, the process 200->202->204->206 is performed in a proper sequence according to aforesaid process. If, in step 206, state 2 transfers to state 1, the process of 208->210 is continuously performed. Since the second edge signals without edge grips are obtained by constant scanning in step 208, if it is determined that the second edge signal is less than the first threshold value (Th1) in step 210, the process directly enters step 214 till the end.

In the third embodiment, the process 200->202->204->206 is performed in a proper sequence according to aforesaid process. If, in step 206, state 1 transfers to state 2, the process of 208->210 is continuously performed. If it is determined in step 210 that state 2 transfers to state 1 again, namely, the second edge signals without edge grips are obtained by constant scanning in step 208, wherein the second edge signal is less than the first threshold value (Th1) in step 210, it means the determination in step 210 is No, and step 214 is performed. The whole process includes 200->202->204->206->208->210->214 until the end.

In the fourth embodiment, the process 200->202->204->206 is performed in a proper sequence according to aforesaid process. If, in step 206, state 1 is transferred to state 2, the process of 208->210 is continuously performed. If it is determined in step 210 that state 2 transfers to state 2' again, namely, the second edge signals with edge grips are obtained by constant scanning in step 208. Accordingly, it is determined that the second edge signal is greater than the first threshold value (Th1) in step 210, which means that the determination in step 210 is YES, and the step 212 is continuously performed. The edge area state 2 is recorded and the first edge signal is updated as the next standard signal. The process of 202->204->206 is continuously performed, and the edge signals corresponding to state 2' are obtained in step 204, which are then compared to the edge signal of last edge area state, namely the edge signal corresponding to state 2 in step 206. The edge area state then performs the process of 208->210->212, wherein the edge area state recorded in the step 212 is State 2', and wherein the edge signal corresponding to state 2' is updated as a new standard signal. The process of 202->204->206 is continuously performed till it is determined in step 206 that the edge area state never changes again, and then the edge signals are eliminated to obtain the normal touch signal.

In the fifth embodiment, the process 200->202->204->206 is performed in a proper sequence according to aforesaid process. If it is determined in step 206 that state 2 transfers to state 1, the process of 208->210 is continuously performed. If it is determined in step 210, that state 1 transfers to state 2 again, the second edge signals with edge grips are obtained by constant scanning in step 208. Accordingly, it is determined that the second edge signal is greater than the first threshold value (Th1) in step 210. Thus, the determination in step 210 is YES and step 212 is performed to record the edge area state as state 1 and update the first edge signal corresponding to state 1 as next standard signal. The process of 202->204->206 is continuously performed again since the edge signals corresponding to state 2, as obtained in step 204, are compared to the edge signal of last edge area state, namely the edge signal corresponding to state 1 in step 206. If the edge area state changes, the process of 208->210->212 is performed, wherein the edge area state recorded in step 212 is state 2. The edge signal corresponding to state 2 is updated as a new standard signal. The process of 202->204->206 is continuously performed till it is determined in step 206 that the edge area state never changes again, and then the edge signals are eliminated for obtaining a normal touch signal.

In order to adapt to different sizes of fingers or touch objects, the edge grip detection method of touch panel provided by the present disclosure also comprises a process of adjusting sizes of edge areas of touch panel based on recorded edge signals of edge area. For illustrations, when edge grip occurs at the position of electrodes X1 and X2, the left edge area can be adjusted at the positions of touch panel that correspond to electrodes X1 and X2.

The edge grip detection method of the touch panel provided by the present disclosure can use a scanning detection method based on self-capacitance detection principle or other detection principles, such as aforesaid touch signal, first edge signal, second edge signal or standard signal, all of which are based on self-capacitance sensing produced by touch.

Figure 12:
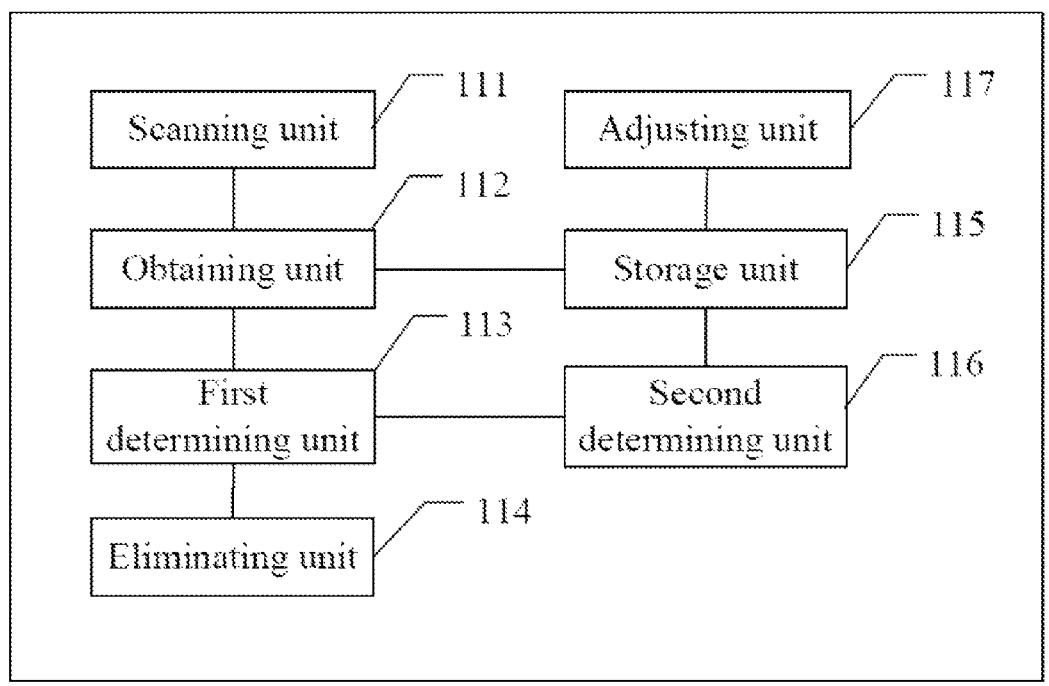
FIG. 12 is a structural diagram of an edge grip detection device of a touch panel in accordance with the embodiments provided by the present disclosure.

Aforesaid edge grip detection method of the touch panel can be implemented by an edge grip detection device of the touch panel provided by the present disclosure. As shown in FIG. 12, the detection device 110 and the touch panel 100 are electrically connected (not shown), wherein the detection device 110 mainly comprises a first determining unit 113, an eliminating unit 114, and a storage unit 115. The first determining unit 113 is used for determining whether an edge area state has changed. The eliminating unit 114 is used for eliminating first edge signal when the edge area state does not change. The storage unit 115 is used for updating the first edge signal as a next standard signal when the edge area state changes.

In another embodiment, aforesaid detection device 110 further comprises a scanning unit 111, an obtaining unit 112, and a second determining unit 116. The scanning unit 111 is used for scanning first axial electrode 101 and second axial electrode 102 of the touch panel, and touch signal obtained by scanning is outputted to obtaining unit 112. The touch signal further comprises a first edge signal. The obtaining unit 112 calculates A/D conversion of the touch signal, thereby obtaining capacitance sensing signal waveforms of X axis and Y axis. The first determining unit 113 compares the first edge signal obtained by the obtaining unit 112 with the edge signal of the last edge area state to determine whether the edge area state has changed. The specific determining condition and determining method of the first determining unit 113 are essentially the same as aforesaid edge grip detection method of a touch panel and hence not described again. When the first determining unit 113 determines that the edge area state has not changed, the elimination unit 114 eliminates a first edge signal to obtain a normal touch signal. When the first determining unit 113 determines that the edge area state has changed, storage unit 115 records the edge area state and updates the first edge signal as a next standard signal.

In order to avoid misjudging of noise signals as the first edge signal, if the determination by the first determining unit 113 is YES, the scanning unit 111 is used for scanning the same edge area to obtain a second edge signal. The detection device 110 further comprises a second determining unit 116, which is used for determining whether the second edge signal strength is greater than first threshold value. If the second edge signal strength is greater than the first threshold value, the storage unit 115 records the edge area state and updates the first edge signal as next standard signal; whereas if the second edge signal is less than or equal to the first threshold value, the elimination unit 114 eliminates the first edge signal.

In order to adapt to different sizes of fingers or touch objects, the edge grip detection device of touch panel provided by the present disclosure further comprises an adjusting unit 117, which adjusts the size of edge area of touch panel 110 based on the fist edge signal recorded in the storage unit 115.

Edge grip detection device of touch panel 110 provided by the present disclosure can use scanning detection based on self-capacitance detecting principles or other detecting principles, such as aforesaid touch signal, first edge signal, second edge signal or standard signal, all of which are based on self-capacitance sensing produced by touch.

Aforesaid edge grip detection method and device of touch panel can opportunely detect and dynamically update state and data of edge area. The edge grip occurs on the edge area of the touch panel and eliminates the edge signals from touch signals of the touch panel, thereby obtaining normal touch signal and enabling position of normal touch points to be accurately determined even when the edge grip occurs. Thus, impact on the normal operation of the touch panel, caused by edge grips, is avoided and the operation accuracy of a touch panel is improved.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. An edge grip detection method of a touch panel, wherein the touch panel comprises a plurality of first axial electrodes, a plurality of second axial electrodes, an edge area and an operation area, the method comprising:
   a) determining whether an edge area state has changed, comprising steps of:
      determining whether sum of signal strength of the first axial electrode on the edge area is greater than a first threshold value;
      further determining whether sum of signal strength of the first axial electrode on other areas is less than a second threshold value; and
      determining whether number of touched first axial electrodes is less than or equal to number of electrodes on the edge area;
   b) eliminating a first edge signal when the edge area state does not change; and
   c) updating the first edge signal as a next standard signal when the edge area state changes.

2. The edge grip detection method of the touch panel of claim 1, wherein the step a) further comprises: comparing the first edge signal with the edge signal of last edge area state to determine whether the edge area state has changed.

3. The edge grip detection method of the touch panel of claim 1, further comprising the following steps before updating the first edge signal as a next standard signal:
   d) scanning the same edge area again to obtain a second edge signal; e) determining whether the second edge signal strength is greater than a first threshold value; f) recording the edge area state and updating the first edge signal as next standard signal if the second edge signal strength is greater than the first threshold value; and g) eliminating the first edge signal if the second edge signal is less than or equal to the first threshold value.

4. The edge grip detection method of a touch panel of claim 1, wherein the step a) further comprises, determining whether variation of signal strength of any of the first axial electrodes on the edge area is greater than a third threshold value or determining whether variation of signal strength of any of the second axial electrodes is greater than a fourth threshold value.

5. The edge grip detection method of the touch panel of claim 1, wherein the step a) further comprises: determining whether number of touched first axial electrodes or touched second axial electrodes on the edge area is 0.

6. The edge grip detection method of the touch panel of claim 1, wherein the step a) further comprises, determining whether sum of signal strength of the second axial electrode on the edge area is greater than a first threshold value, further determining whether sum of signal strength of the second axial electrode on other areas is less than a second threshold value, and further determining whether number of touched first axial electrodes is less than or equal to number of electrodes on the edge area.

7. The edge grip detection method of the touch panel of claim 6, wherein the step a) further comprises, determining whether variation of signal strength of any of the second axial electrodes on the edge area is greater than a third threshold value or determining whether variation of signal strength of any of the first axial electrodes is greater than a fourth threshold value.

8. The edge grip detection method of the touch panel of claim 1, wherein the method further comprises the following step before the step a): scanning the edge area and the operation area to obtain touch signals on the touch panel, wherein the touch signals comprise the first edge signals.

9. The edge grip detection method of the touch panel of claim 8, wherein both the touch signal and the first edge signal are based on self-capacitance changes generated by touch.

10. An edge grip detection device of a touch panel, wherein the touch panel comprises a plurality of first axial electrodes, a plurality of second axial electrodes, an edge area and an operation area, the detection device comprising:
   a first determining unit used for determining whether an edge area state has changed, wherein the first determining unit is further used for: determining whether sum of signal strength of the first axial electrode on the edge area is greater than a first threshold value, and determining whether sum of signal strength of the first axial electrode on other areas is less than a second threshold value, and determining whether number of touched first axial electrodes is less than and equal to number of electrodes on the edge area;
   an eliminating unit used for eliminating a first edge signal if the edge area state does not change; and
   a storage unit used for updating the first edge signal as a next standard signal if the edge area state changes.

11. The edge grip detection device of the touch panel of claim 10, wherein the first determining unit is further used for: determining whether variation of signal strength of any first axial electrode on the edge area is greater than a third threshold value or determining whether variation of signal strength of any second axial electrode is greater than a fourth threshold value.

12. The edge grip detection device of the touch panel of claim 10, wherein the first determining unit is further used for: determining whether the number of touched first axial electrodes or touched second axial electrodes on the edge area is 0.

13. The edge grip detection device of the touch panel of claim 10, wherein the first determining unit is further used for: determining whether sum of signal strength of the second axial electrode on the edge area is greater than a first threshold value, and determining whether sum of signal strength of the second axial electrode on other areas is less than a second threshold value, and determining whether number of touched second axial electrodes is less than or equal to number of electrodes on the edge area.

14. The edge grip detection device of the touch panel of claim 13, wherein the first determining unit is further used for: determining whether variation of signal strength of any second axial electrode on the edge area is greater than a third threshold value or determining whether variation of signal strength of any first axial electrode is greater than a fourth threshold value.

15. The edge grip detection device of the touch panel of claim 10, further comprising: a scanning unit used for scanning the same edge area again to obtain a second edge signal when the edge area state changes; and a second determining unit used for determining whether the second edge signal strength is greater than a first threshold value, wherein if the second edge signal strength is greater than the first threshold value, the storage unit records the edge area state and updates the first edge signal as a next standard signal, further wherein if the second edge signal is less than or equal to the first threshold value, the eliminating unit eliminates the first edge signal.

16. The edge grip detection device of the touch panel of claim 15, wherein the scanning unit is used for scanning the edge area and the operation area to obtain touch signals on the touch panel, wherein the touch signal comprises the first edge signals and the first edge signal are based on self-capacitance changes generated by touch.

* * * * *